Feb. 14, 1950   G. R. LAURE   2,497,224
PLASTIC ROLLER
Filed Jan. 11, 1949
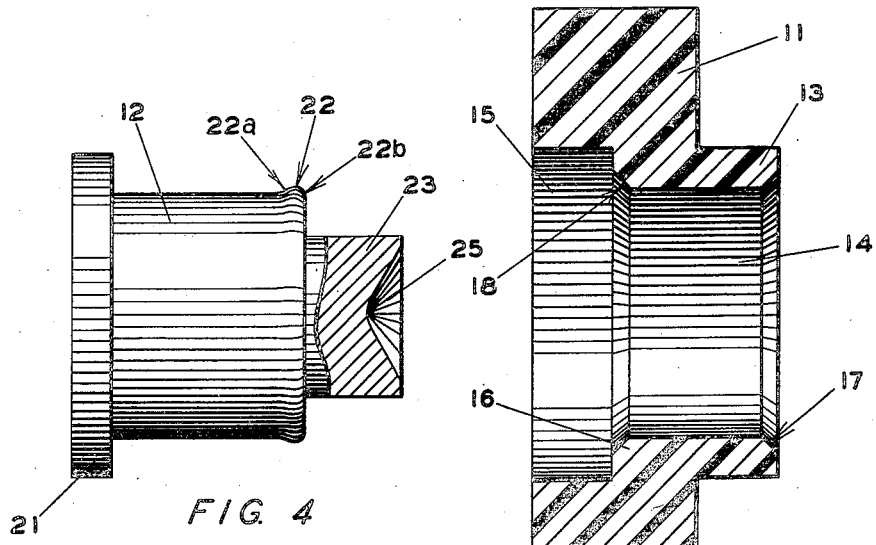
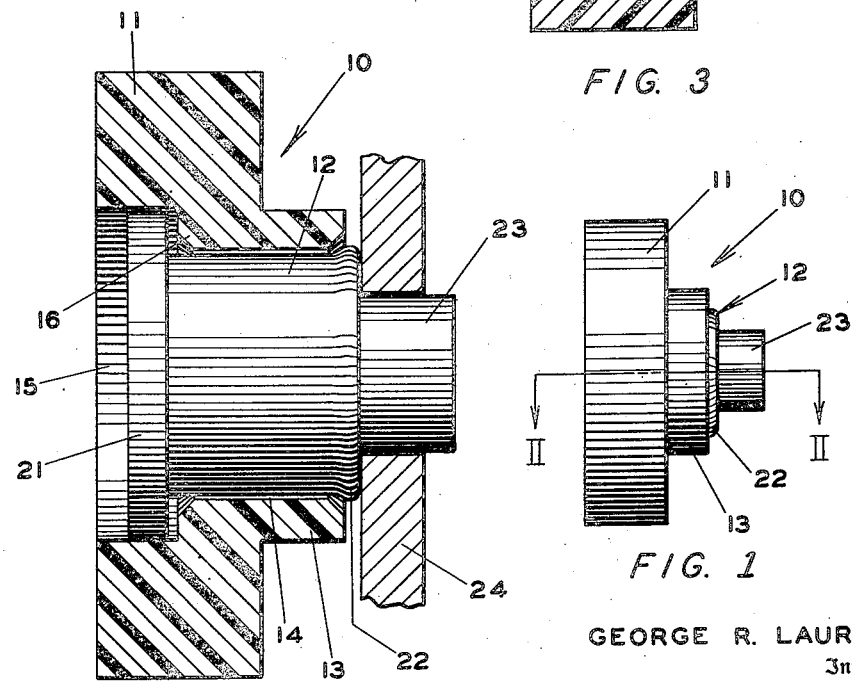
GEORGE R. LAURE
Inventor
Attorney Patented Feb. 14, 1950

2,497,224

UNITED STATES PATENT OFFICE 2,497,224

PLASTIC ROLLER

George R. Laure, Kalamazoo, Mich.

Application January 11, 1949, Serial No. 70,301

7 Claims. (Cl. 308—15)

This invention relates in general to a roller and more particularly to a roller wheel composed of a synthetic resin impregnated with resilient filler material and a dry lubricant, and rotatably supportable upon a shaft.

Persons familiar with the manufacture or use of metal equipment having mutually movable parts separated by rollers, such as the drawers in stoves, desks and cabinets, have recognized the need for improved rollers to support said drawers. Present conventional types of such rollers are not completely satisfactory for several reasons. Metal rollers are too noisy in operation and require frequent oiling. Wooden rollers wear out quickly, are fracturable and must be used within a limited temperature and humidity range since heat, cold and moisture severely affect their strength and shape. Rubber rollers are too expensive for many uses and are also adversely affected by heat and cold.

Further, in manufacturing articles utilizing rollers, especially small ones, cost is an important factor, both original cost and cost of installation. Hence, a roller which is quiet and durable in operation and yet is inexpensive to fabricate and to install will be of great value.

Accordingly, a primary object of this invention is the provision of an improved roller, especially for use with drawers in metal equipment.

A further object of this invention is the provision of a roller, as aforesaid, which is quiet in operation, appropriate for use within a wide range of temperatures, substantially unfracturable, self-lubricating and highly resistant to wear.

A further object of this invention is the provision of a roller wheel, as aforesaid, having a coaxial cylindrical opening therethrough, for rotatable support on a metal shaft having a circumferential flange at one end and a circumferential ridge near its opposite end, said ridge being slightly larger in its outside diameter than said opening and yieldingly receivable through said opening, and said flange and ridge preventing axial displacement of said wheel with respect to said shaft.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a cylindrical roller wheel having a coaxial, substantially cylindrical shaft opening therethrough and a shaft rotatably supported within, and extending through, said opening, said shaft having a circumferential flange at one end thereof and a circumferential ridge near the opposite end thereof.

The wheel is fabricated from a synthetic resin, such as phenol formaldehyde, which is advantageously impregnated with a resilient material, such as a cotton flock or a macerated textile fabric, and a solid lubricant, such as graphite. The shaft may be made from any convenient material, such as cold rolled steel.

For illustration of a preferred embodiment of the invention, attention is directed to the accompanying drawings in which:

Figure 1 is a side elevation view of the assembled roller and shaft to which this invention relates.

Figure 2 is a cross-sectional view of Figure 1 taken along the line II—II.

Figure 3 is a cross-sectional view of the roller substantially as shown in Figure 2, but without the shaft.

Figure 4 is a broken, side elevation view of the said shaft.

Construction

The roller 10 (Figure 1), which is comprised of a roller wheel 11 (Figures 2 and 3) and a roller shaft 12 (Figures 2 and 4), is usually relatively small in actual size in the embodiment of the invention here chosen for illustrative purposes, such wheel usually being under one inch in diameter for most installations wherein this invention is applicable. The wheel of the particular roller here illustrated, which is adapted and designed for supporting a medium size, metal, oven drawer, is approximately one-half inch in diameter. It will be understood, however, that such arbitrary selection of a small wheel, and the references hereinafter to particular dimensions, are all made for illustrative purposes only and the choice of such illustrations is not intended to limit the scope of the invention.

For the purpose of convenience in description the terms "left" or "leftwardly" and "right" or "rightwardly" as used in the following specification will be understood to refer to the left and right ends, respectively, of the roller 10 and the parts thereof when positioned as appearing in any one of the four above mentioned figures. The terms "inwardly" and "outwardly" shall be understood to mean toward and away from, respectively, the geometric center of the roller.

The roller wheel 11, which is preferably composed of a synthetic resin, such as phenol formaldehyde, may be fabricated by compression molding, jet molding, or any other appropriate method of molding, in a conventional manner. Although a cellulosic material, such as cotton flock, a macerated cellulosic fabric or a long fiber wood pulp, is preferably used herein as a resilient filler, other resilient materials which are non-reactive with the resin of the wheel, may also be used. In the preferred embodiment of my invention the resilient filler, cotton flock, constitutes approximately 45 per cent of a finished wheel. Thus, said filler imparts sufficient compressibility and flexibility to the finished wheel, in spite of the phenol formaldehyde, which otherwise is relatively brittle, to enable it to function better in the manner hereinafter described. The graphite, which preferably constitutes about 5 per cent of the wheel, automatically provides both the external and internal surfaces of said wheel with self-lubricating properties.

These particular proportions are, of course, given solely as examples and the substance of the invention may still be practiced with the resilient filler present in the range of between about 40 and about 50 per cent by weight with the flexibility of the resulting wheel varying accordingly. Likewise, the lubricant may vary between about 4 and about 6 per cent by weight with the lubricating characteristics varying accordingly.

The wheel 11, which may be provided with a coaxial hub 13 extending from one side thereof, here the right side, has a coaxial, cylindrical shaft opening 14 extending therethrough. Said shaft opening 14 has, at the leftward end thereof, a flange chamber 15 of enlarged diameter, thereby creating the internal shoulder 16 between the leftward end of the shaft opening 14 and the rightward end of the flange chamber 15. The wall of the shaft opening 14 is provided with an external bevel 17 at the rightward end thereof and an internal bevel 18 at the leftward end thereof along the shoulder 16.

In this particular embodiment of the invention, the shaft opening 14 has a straight, truly cylindrical bore and is preferably approximately .382 inch in diameter. This dimension, as well as others specifically stated hereinbefore and hereinafter, are not intended to limit the scope of the invention, but instead are intended to define one set of specific conditions under which the invention was found to be favorably operable.

Alternatively, the shaft opening 14 may, if desired, be tapered slightly with the larger diameter of said opening near one end thereof. A favorable taper was found to exist when said shaft opening was about .384 inch in diameter at the leftward end and approximately .381 inch in diameter at the rightward end thereof.

The shaft 12, (Figures 2 and 4) in the particular embodiment selected for illustration, preferably has a diameter of approximately .376 inch for satisfactory cooperation and rotational support within the shaft opening 14. Said shaft is provided with a cylindrical, circumferential, and preferably integral, flange 21 which is located at the leftward end thereof. The flange 21 is substantially larger in diameter than the shaft opening 14 but is sufficiently smaller than the diameter of the flange chamber 15 to permit free rotation of the flange 21 therewithin when the shaft 12 is operably positioned within the shaft opening 14. Thus, the flange 21 positively restricts the rightward, axial movement of the shaft 12 through the wheel 11 by engaging the internal shoulder 16.

The rightward end of the shaft 12 is provided with a circumferential, preferably integral, ridge 22, preferably faired at its leftward face 22a for better cooperation with the beveled face 17 of the wheel. The rightward edge is rounded at 22b to permit its easier entry, as further detailed hereinafter, into the central opening 14 of the wheel. In this embodiment of the invention, the ridge 22 is approximately .386 inch in diameter and, therefore, extends outwardly from the surface of the shaft 12 about .005 inch entirely therearound. Accordingly, the inside diameter of the shaft opening 14, whether straightbore or tapered bore, is preferably approximately .004 inch smaller in diameter at the rightward end thereof than the outside diameter of the ridge 22. These dimensions are, of course, only illustrative and may be varied according to the size of the roller, but in general, the diameter of said ridge 22 will exceed the diameter of that end of the shaft opening 14 adjacent to the ridge by from about 0.002 inch to about 0.005 inch, depending upon the resilience of the material comprising the walls of the shaft opening with the smaller figure being applicable to the less resilient material. Of course, in the light of the foregoing, it will be obvious that the ridge 22 should be of a diameter sufficiently less than that to which the walls of that portion of the opening 14 being contacted at any one time by said ridge as it passes through said opening may be distorted without permanently distorting said walls that it can be urged through said opening without injury to said walls. The diameter of the shaft, where a straightbore shaft opening 14 is provided, is such that it fits closely to the walls of the shaft opening 14, the clearance being only sufficient to permit easy rotation of the wheel.

The shaft 12 may be provided with an integral, coaxial, cylindrical shaft extension 23 of reduced diameter extending from the rightward end of the shaft 12 and thereby providing means by which the shaft 12 may be secured to and supported upon any convenient support means, such as the plate 24. The rightward, or free, end of the shaft extension 23 may be provided with a recess 25 (Figure 4) to facilitate the upsetting of said rightward end against the adjacent side of the plate 24 or other support means to which the said shaft may be secured.

*Operation*

After fabrication of the wheel 11 and shaft 12, they are then positioned with respect to each other about as shown in the Figures 3 and 4, and the rightward end of the shaft 12 is inserted into the leftward end of shaft opening 14. The internal bevel 18 assists in guiding the ridge 22, which is slightly larger in diameter than said shaft opening 14, into said opening as said shaft is urged rightwardly with respect thereto. The ridge 22 preferably emerges through the rightward end of the shaft opening 14 just before the flange 21 engages the internal shoulder 16. The flexibility of the wheel, improved by its impregnation with said resilient filler, permits the walls of the shaft opening 14 to be flexed outwardly as the ridge 22 passes thereby, without fracturing or otherwise damaging said wheel. The graphite impregnated in the wheel facilitates the movement of the ridge 22 through the opening 14 and also provides indefinite lubrication for the shaft opening 15 in which the shaft 12 is rotatably supported. The flange 21 and ridge 22, when the shaft is in operating position, restrict the leftward and rightward movement, respectively, of the wheel 11 with respect to the shaft 12 under conditions of normal operation.

The shaft 12 may be removed from the shaft opening 14 by urging it leftwardly, but a great deal more force is required than is needed to urge the shaft rightwardly through said shaft opening. However, in neither case is the structure of the wheel 11 injured by such leftward or rightward movement of the shaft with respect thereto. It is not known why the ridge 22 on the shaft 12 will pass one way through the shaft opening 14 in the roller with only moderate difficulty, but will pass through said opening in the opposite direction only with considerable difficulty. However, such results have been repeatedly observed with many different samples of different sizes and have hence been definitely established. The only explanation which has occurred to me thus far is that as the shaft is inserted into the roller hub and displaces plastic material radially outwardly by compression thereof, it also displaces said material forwardly to provide a slight ripple in the surface defining the shaft opening 14. This ripple forms without hindrance when the shaft is entering said shaft opening. However, when the shaft is being retracted from said opening, leftwardly as appearing in the drawings, the said ripple is formed in the wall thereof adjacent to the body of the shaft 12 whose surface is spaced only slightly from the walls of the shaft opening 14. Thus, the ripple tending to form ahead of the ridge 22, as said shaft is removed from said opening, now encounters the surface of the shaft and is held against free formation. This either binds the shaft against movement or forces the entire yielding to the ridge 22 to be absorbed in the body of the roller, and thus substantially obstructs the movement of the shaft as it is removed.

The ridge 22 is sufficiently larger than the inside diameter of the shaft opening 14 positively to prevent accidental removal of the roller wheel from the rightward end of the shaft 12 over the ridge 22, even though said wheel rotates freely on said shaft. The cooperation of the bevel 17 and the fairing 22a improves this holding and prevent the wheel from working up onto the ridge as it rotates. Easy mounting of the assembly, to a suitable supporting means, such as a plate 24, is attained by upsetting the rightward end of said shaft extension against said plate or otherwise securing it in any conventional manner.

It will be recognized that other synthetic resins and similar organic compounds, such as urea, styrene, or nylon may be used in place of the phenolics with varying degrees of success depending on their physical properties. For example, since urea is more brittle than the phenolics, the difference in diameter between the opening 14 and the ridge 22 would be less than a wheel made from urea than with a wheel made from a phenolic. It has also been found that the cellulosic material used in imparting flexibility and compressibility to the plastic may be omitted entirely therefrom and still there will be provided a wheel satisfactory for use under some circumstances. It will be seen, of course, that using a plastic without the filler reduces the resistance of the wheel to shock and rough treatment and increases the chances of fracturing the wheel when the ridge 22 is passed through the shaft 14 thereof.

It has been found that a fully cured plastic wheel is preferable for completely satisfactory operation. However, since less than fully cured material will be satisfactory in some instances, this mention of complete curing is not intended to impose any limitation upon the scope of this invention.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In a roller, the combination comprising: a cylindrical wheel less than approximately one inch in diameter and composed of substantially fully cured phenol formaldehyde impregnated with about 40 per cent by weight of a finely divided cellulosic material and about 4 per cent by weight of graphite, said wheel having a cylindrical, axial shaft opening therethrough with a portion thereof being of enlarged diameter and thereby providing a shoulder in the wall of said shaft opening, said wall being beveled at said shoulder and at the opposite end thereof; a cylindrical shaft rotatably disposed within and extending beyond both ends of said opening, said shaft having an integral, circumferential flange extending therefrom adjacent to one end thereof, said flange being rotatably disposed within the enlarged portion of said opening adjacent to and engageable with said shoulder, said shaft having a circumferential ridge extending therefrom adjacent to the other end thereof, said ridge being approximately 0.002 to 0.005 inch larger in diameter than said opening and from about 0.001 to about 0.003 inch larger in outside diameter than said shaft thereby permitting said ridge to be urged through said opening without injuring said wheel while preventing said wheel from being accidentally displaced axially from said shaft after said shaft is through said opening, and said shaft having an integral, cylindrical, coaxial rivet extending from said other end thereof.

2. In a roller, the combination comprising: a cylindrical wheel composed of a synthetic resin impregnated with finely divided cellulosic material and graphite, said wheel having a cylindrical axial shaft opening therethrough with a portion thereof being of enlarged diameter and thereby providing a shoulder in the wall of said opening; a cylindrical shaft snugly and rotatably receivable within said shaft opening, said shaft having a circumferential flange extending therefrom adjacent to one end thereof and rotatably disposable within the enlarged portion of said opening adjacent to said shoulder, said shaft having a circumferential ridge slightly larger in diameter than said opening and extending from said shaft near the other end thereof, said ridge being urgable through said opening without injuring said wheel while preventing said wheel from sliding off said shaft, and said shaft having a support portion extending from said other end thereof.

3. In a roller, the combination comprising: a cylindrical wheel composed of synthetic resin impregnated with a resilient filler, non-reactive with said resin, and graphite, said wheel having a shaft opening therethrough; a cylindrical shaft rotatably disposed within said opening, a portion of the walls of said opening snugly engaging said shaft, and said shaft having a circumferential flange at one end thereof and a circumferential ridge, slightly larger in diameter than said opening, near the other end thereof, said ridge being urgable through said opening without injuring said wheel and cooperable with said flange for retaining said wheel therebetween on said shaft; and supporting means extending from one end of said shaft.

4. In a roller, the combination comprising: a wheel composed of synthetic resin impregnated with graphite, said wheel having a shaft opening therethrough; a shaft snugly but rotatably receivable within said opening, said shaft having a flange near one end thereof and a circumferential ridge, slightly larger in diameter than said opening, near the other end of said shaft, said ridge being urgable through said opening without injuring said wheel and cooperable with said flange for retaining said wheel on said shaft; and supporting means associated with one end of said shaft.

5. In a roller, the combination comprising: a wheel composed of a synthetic resin impregnated with a dry lubricant, said wheel having a shaft opening therethrough; a shaft snugly but rotatably receivable within said opening and extendable therethrough, said shaft having a flange near one end thereof of a diameter substantially larger than said opening, and a circumferential ridge near the other end of said shaft having rounded corners and being slightly larger in diameter than the normal diameter of said opening but of less diameter than said flange, said ridge also being of a diameter less than that to which the walls of said opening will distort without permanent distortion thereof, whereby said ridge is urgable through said opening without injuring said wheel and is cooperable with said flange for retaining said wheel on said shaft after said shaft is through said opening; and supporting means associated with one end of said shaft.

6. In a roller, the combination comprising: a cylindrical body part comprising a synthetic resin impregnated with a dry lubricant and having a central opening therethrough; a shaft extending through said opening; radially extending means on said shaft positively preventing movement of said shaft with respect to said body part in one direction; a circumferential, radially extending, ridge spaced from said flange and being slightly larger in diameter than said opening, said ridge being urgable through said opening without injuring said wheel and cooperable with said flange for retaining said wheel on said shaft; and supporting means associated with one end of said shaft.

7. The combination claimed in claim 1 wherein said ridge is approximately 0.002 to about 0.003 inch larger in its outside diameter than said shaft.

GEORGE R. LAURE.

REFERENCES CITED

The following references are of record in the file of this patent:

UNITED STATES PATENTS

| Number | Name | Date |
|---|---|---|
| 539,543 | Ransden | May 21, 1895 |
| 1,832,515 | Webster | Nov. 17, 1931 |
| 1,912,083 | Lytle | May 30, 1933 |
| 2,087,470 | Davidson | July 20, 1937 |